April 24, 1962 G. NAKAGAWA 3,031,311
FROZEN STRAWBERRY PACKAGE
Filed Sept. 14, 1959
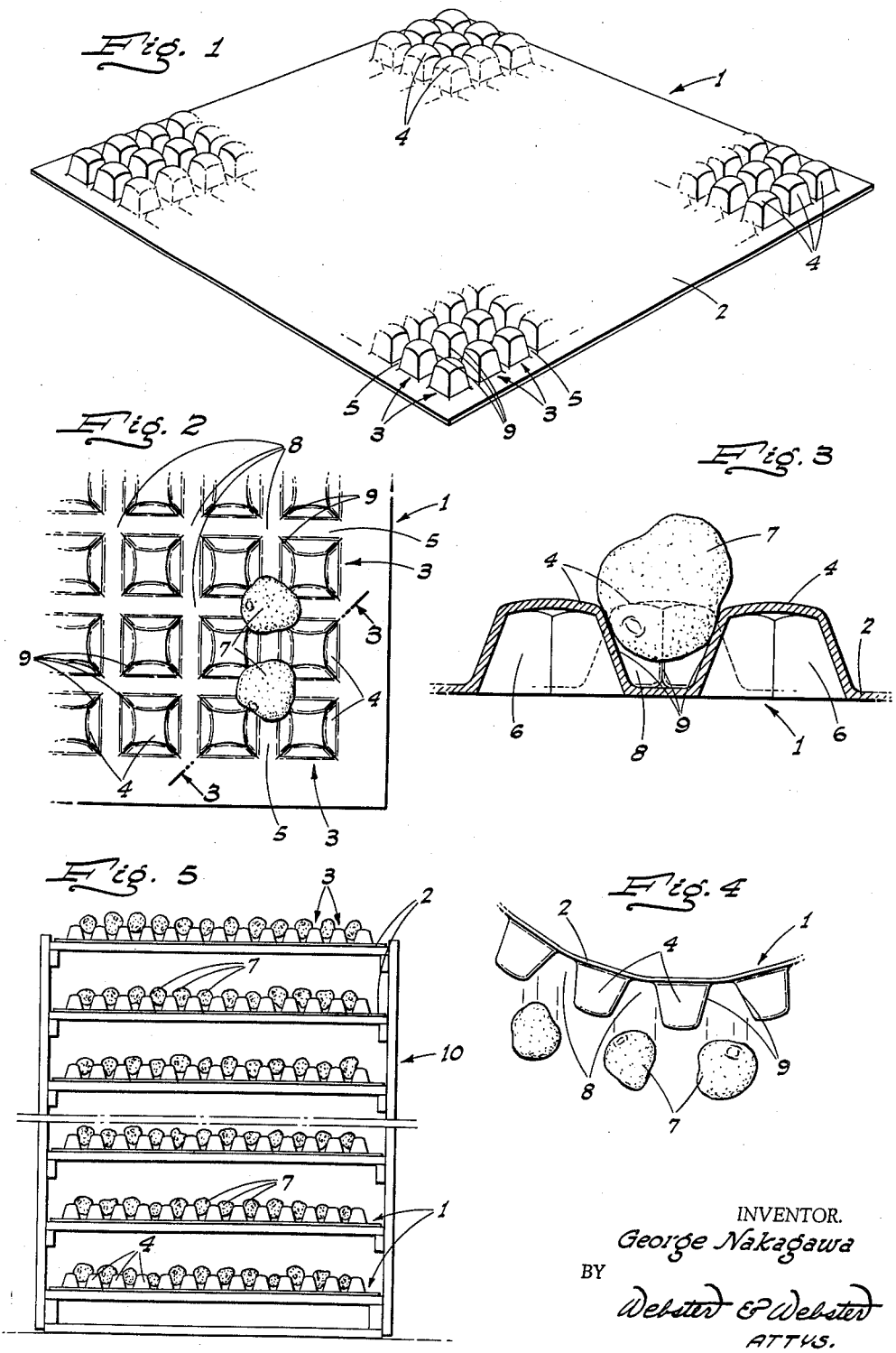
INVENTOR.
George Nakagawa
BY
Webster & Webster
ATTYS.

United States Patent Office 3,031,311
Patented Apr. 24, 1962

3,031,311
FROZEN STRAWBERRY PACKAGE
George Nakagawa, Bluegum and Dakota Ave.,
Modesto, Calif.
Filed Sept. 14, 1959, Ser. No. 839,900
2 Claims. (Cl. 99—193)

This invention relates to the fresh-produce freezing industry, and particularly to the quick-freezing of fresh strawberries.

In processing and packing what is known in the industry as "I.Q.F." (individually quick-frozen) strawberries, problems have arisen due to the tendency of the washed berries to stick together in large chunks or masses when put into the freezing tunnels.

Before quick-freezing the berries, they are graded and thoroughly washed by suitable means. Up to this time, the berries are then drained as well as possible before being put into crates which go into the freezing tunnels. In the crates the berries of course contact each other, and the residual moisture thereon causes the berries to freeze together, to form frozen chunks or clusters.

In order to then break up these clusters they are run through rubber-roller "busters," as they are called. This results in many of the berries breaking into pieces, with a consequent lessening of the quality—in appearance at least—of the frozen product as marketed.

It is therefore the major object of my invention to eliminate the above described and objectional freezing-together of the strawberries to be frozen, by providing a device, and a method of handling the strawberries in connection with such device, so that while the berries are being frozen they are maintained in spaced relation to each other. At the same time, better drainage from the berries, and improved circulation of the freezing medium past the berries, is obtained.

It is also an object of the invention to provide a practical and reliable tray for, and method of, processing individually quick-frozen strawberries, or the like, and one which will be exceedingly effective for the purpose for which it is designed.

These objects are accomplished by means of such structure and relative arrangement of parts as will fully appear by a perusal of the following specification and claims.

In the drawings:

FIG. 1 is a somewhat diagrammatic perspective view of the berry supporting tray which constitutes the device of my invention.

FIG. 2 is a fragmentary plan view of the tray, showing a couple of strawberries mounted thereon.

FIG. 3 is an enlarged fragmentary sectional elevation on line 3—3 of FIG. 2.

FIG. 4 is a fragmentary side elevation of the tray showing the same as inverted and flexed or bent to discharge the strawberries therefrom.

FIG. 5 is a fragmentary end elevation of a tray supporting rack with a plurality of loaded trays thereon.

Referring now more particularly to the drawings, and to the characters of reference marked thereon, the special tray 1 used in connection with my quick-freezing and processing method is a flat rectangular base plate 2 made of a flexible plastic material such as polyethylene. Formed with and projecting upwardly from the base in evenly spaced relation and in parallel rows 3 extending over substantially the entire area thereof are risers or nipples 4. These rows extend evenly both lengthwise and transversely of the base, so as to leave straight and continuous intersecting "aisles" 5 between all the different rows. The nipples 4 are preferably of square form in plan, tapering somewhat to their upper end and hollowed out from below, as at 6, for the sake of lightness and flexibility.

The height and spacing of the nipples 4 relative to the width of any graded strawberries 7 to be placed on the tray is such that any such strawberry deposited in the space 8 defined by the four corners 9 of four adjacent nipples at the intersection of the corresponding aisles 5 will be engaged by such edges and will be held clear of the base 2, as shown in FIG. 3. Also, the horizontal dimensions of the nipples are sufficiently large to prevent any berries, seated in adjacent spaces 8, from possibly contacting each other.

The taper of the sides, and consequently the corner edges of the nipples, provides a margin for engagement with berries of somewhat varying sizes, while at the same time preventing such berries from sliding down and contacting the base 2.

This special tray is used as a practical instrumentality in carrying out my improved freezing and processing method, which is as follows:

The berries 7 to be processed are graded and washed, and after draining the same of the wash water, they are distributed onto the trays 1 so that only the spaces 8 between any four adjacent nipples 4 are occupied by the berries, and a single layer only of the berries is thus supported on any tray, and all such berries are maintained in spaced relation to each other.

The loaded trays are then placed on a portable rack 10 of a type which may be engaged by a conventional fork-lift truck, and conveyed by the truck into the usual freezing tunnel. Any water which may remain on the berries when they are placed on the tray tends to drain therefrom and collect on the base 2 instead of forming a bond between adjacent berries when they are frozen, as is the case with the presently employed berry contacting method.

When the berries are frozen, the trays are removed from the tunnel and rack, and said trays are then inverted and flexed or bent downwardly so that the base 2 becomes convexly curved in a downward direction. The nipples 4 are thus spread apart from the base 2 downwardly, allowing the frozen and still separated berries to drop cleanly from contact with the nipples, as shown in FIG. 4. No fracturing of the berries or other damage to the appearance thereof is therefore had. The fact that the berries engage the nipples at the corner edges 9 only thereof, prevents any tendency of the berries to freeze to said nipples, and insures a rapid and smooth break-away of the berries therefrom when a tray is inverted and flexed.

From the foregoing description it will be readily seen that there has been produced such a tray for, and method of, processing individually quick-frozen strawberries, or the like, as will substantially fulfill the objects of the invention, as set forth herein.

While this specification sets forth in detail the present and preferred construction and use of such tray and method, still in practice such deviations from such detail may be resorted to as do not form a departure from the spirit of the invention, as defined by the appended claims.

Having thus described the invention, the following is claimed as new and useful, and upon which Letters Patent are desired:

1. In the quick-freeze industry, a tray and strawberry combination comprising a tray having a flat flexible plastic base member, and nipples of square section in plan projecting upwardly from the base in the form of parallel rows crossing each other in right-angle relation and leaving parallel rows of intersecting spaces therebetween, and strawberries supported on the tray in said spaces at the intersections thereof; the corner edges of the nipples being straight and sloping down in converging relation to each other and the spacing and height of the nipples relative to the strawberries being such that a strawberry disposed in the spaces on the tray between four adjacent nipples will be engaged intermediate its ends by said corner edges of the nipples and held in spaced relation to the base and to other adjacent edge-engaged strawberries.

2. In the quck-freeze industry, a tray and strawberry combination comprising a tray having a flat flexible plastic base member, and nipples of square section in plan projecting upwardly from the base in the form of parallel crossing rows, and strawberries supported on the tray; the nipples being of a size, shape, and spacing relative to the size of the strawberries thereby engaging each one of such strawberries intermediate its ends at four evenly spaced points only about its periphery and hold such strawberry in spaced relation to the base.

References Cited in the file of this patent

UNITED STATES PATENTS

| | | |
|---|---|---|
| 1,945,024 | Coil et al. | Jan. 30, 1934 |
| 2,167,818 | Wagner | Aug. 1, 1939 |
| 2,443,866 | Noyes | June 22, 1948 |
| 2,482,202 | Noyes | Sept. 20, 1949 |
| 2,597,460 | Eberhardt | May 20, 1952 |
| 2,784,840 | Stefanik | Mar. 12, 1957 |
| 2,809,908 | French | Oct. 15, 1957 |
| 2,909,271 | Taylor | Oct. 20, 1959 |
| 2,922,541 | Martelli et al. | Jan. 26, 1960 |

FOREIGN PATENTS

| | | |
|---|---|---|
| 1,023,148 | France | Dec. 24, 1952 |